3,223,744
BORATE ESTER ALKYLATION
Robert T. Adams, Lafayette, and Philip S. Magee, San Rafael, Calif., assignors to Chevron Research Corporation, a corporation of Delaware
No Drawing. Filed July 20, 1962, Ser. No. 211,414
4 Claims. (Cl. 260—671)

This invention relates to a method of preparing alkyl arenes. More particularly, this invention relates to a method of alkylating aromatic hydrocarbons with borate esters.

Inorganic esters have found some application as a source for alkyl groups in the alkylaton of aromatic hydrocarbons. The use of sulfate esters is well known and even silicate esters have been reported as operable. See, e.g., Kane et al., J. Am. Chem. Soc., 58, 2605–8 (1936). Borate esters have also been used and the reaction has been studied in a recent series of papers. Kustov et al., Doklady Akad. Nauk. S.S.S.R. 106, 479–81 (1956); Zhur. Obshchei Khim. 27, 1454–9 (1957). See also Kaufmann, German Patent No. 555,403.

The alkylations using borate esters all used a stoichiometric amount of aluminum chloride. The reaction was thought to go through the alkyl halide as an intermediate. That an alkyl halide could be formed under the conditions of the reaction was demonstrated. Ya. Ya. Makaro-Zemlyanskii, Nauch. Trudy. Moskov, Tekhnol. Inst. Ligkoi Prom., Sbornik 13, 205–9 (1958).

Aluminum chloride, as well as the other metal halide Friedel-Crafts catalysts, have numerous disadvantages. The reagents are expensive and great care must be taken to maintain them anhydrous. When using aluminum chloride, for example, precautions must be taken that the aluminum chloride is not exposed to the air for any significant duration. The hydroscopic character of aluminum chloride needs no elaboration.

It was, therefore, surprising and of great adavntage to find that borate esters could be used to alkylate arenes in the presence of a protonic catalyst. Moreover, with the long, straight-chain aliphatic groups, i.e., those over 8 carbons, little if any degradation or rearrangement resulting in chain branching occurred.

In carrying out this invention, a borate ester is brought together with an arene in the presence of a protonic catalyst, such as sulfuric acid and hydrofluoric acid, with agitation under mild conditions. After a suitable period of time, the alkyl arene is isolated.

The protonic catalyst of this invention is a strong mineral acid, particularly sulfuric acid and hydrofluoric acid. Only moderate amounts of water, if any, may be present in the acid catalyst. The sulfuric acid should be at least 90% and preferably 95% by weight sulfuric acid. With hydrofluoric acid, the amount of water should not exceed 10% and preferably substantially anhydrous acid should be used, not more than about 2% water.

The borate esters of this invention are aliphatic borates. The aliphatic groups may be alkyl, alicyclic alkyl, alkyl alicyclic, etc. The aliphatic groups may have from 2 to 25 carbons, preferred aliphatic groups have from 8 to 20 carbons. Particularly preferred are those aliphatic groups which are the n-paraffins. The long, straight-chain alkyl groups of more than 8 carbons are of particular interest for their use in detergents. When these alkyl groups are to be used in detergents, it is important for biodegradability that branching of the straight chain be minimized.

By borate esters or aliphatic borates it is intended to include the mono-, di-, and tri-alkyl derivatives, of boric acid, as well as alkoxy boroxines, pyroborates and mixtures thereof. The borate esters of this invention will generally have the following formulas:

$$(RO)_3B \quad (ROBO)_3 \quad (RO)_2BOB(OR)_2$$

The R's may be the same or different. The R's may be hydrogen or aliphatic radicals, with at least one R being an aliphatic radical.

The borate esters may be obtained in a variety of ways. Direct esterification of boric acid with an alcohol is well known. Oxidation of alkyl boranes may also be used to obtain the esters. Another method is the oxidation of paraffins in the presence of boric acid or boric oxide. This last method leads to a complex mixture, the exact composition of which is unknown. The mixture probably includes mono-, di-, and tri-alkyl borates, as well as alkoxy boroxines and pyroborates, in various proportions.

The arenes are aromatic hydrocarbons which find use in this invention. They have up to 18 carbons and 3 fused rings. Such compounds as benzene, naphthalene, anthracene, phenanthrene, toluene, cumene, etc., are illustrative of the arenes which are useful in this invention. Particularly preferred are arenes having up to and including 10 carbons, such as benzene, and alkyl benzenes.

The ratio of reactants and catalysts is important in obtaining good yields. Low ratios of acid to borate ester, either give no or poor yields of the alkylated arene. The equivalents of acid to equivalents of RO— (R is as defined previously) should be at least 5:1 and preferably 10:1, and may even be as high as 50:1. The upper limit of the amount of acid is mainly one of manipulative convenience. If desired, ratios as high as 100:1 may be used.

The mol ratio of benzene to RO— should be at least 1:1 while an excess of benzene is preferred. Mol ratios of benzene to RO— will usually be of the order of 4:1 and may be as high as 20:1 or 50:1. While the upper limit of the mol ratio of benzene to RO— is not critical, the amount of benzene must be greater than stoichiometric in order to obtain satisfactory yields.

Most conditions for the reaction are not critical. The time may be varied widely, although no advantage is found in greatly extending the period of time for the reaction. Usually the reaction will be run for a period of time in excess of 30 minutes. A period of time in the range of 30 minutes to 6 hours is found convenient, although the reaction may be run for a longer period of time without advantage. Ambient temperatures may be used for the reaction, although lower or higher temperatures are also operable. Temperatures in the range of 0° to 100° C. are convenient, although it is preferred to maintain the temperature below 65° C. The pressure is not critical, autogenous pressure being satisfactory. There is no advantage in raising or lowering the pressure, although the reaction can be run at reduced pressure or superatmospheric pressure.

Depending on the particular reactants and the ratios of the various materials, one or two phases may be present. Inert diluents may be used. As a diluent for the organic phase, aliphatic hydrocarbons are operable. However, it is preferred that the reaction be carried out in the absence of a diluent.

The following illustrates how this invention may be carried out in practice.

EXAMPLE I

Into a reactor was added with stirring, 1 part crude dodecyl borate [1], 1 part anhydrous HF and 4 parts benzene. The temperature was maintained at about 7° C.

---

[1] The crude borate ester was obtained as described in Example X.

and the reaction was continued for 45 minutes. The mixture was then allowed to settle. The layers were separated into separate polyethylene flasks. The alkylate was washed with aqueous KOH and then dried with sodium sulfate anhydrous. The dry alkylate was then distilled yielding 0.55 part of phenyl dodecanes.

The following table illustrates a number of reactions carried out in accordance with Example I.

Table I

| Ex. | Borate Ester | Parts Ester | Parts HF | Parts Benzene | Temp., °C. | Time, Min. | Yield, Parts |
|---|---|---|---|---|---|---|---|
| II | $C_{12}$ borate [1] | 1 | 1 | 4 | 7 | 70 | .53 |
| III | do.[1] | 1 | 1 | 4 | 7 | 240 | .68 |
| IV | do.[1] | 1 | 5.8 | 5 | 10-15 | 180 | .84 |
| V | do.[2] | 1 | 6.3 | 5 | 10-15 | 180 | .98 |
| VI | $C_{16}$ borate [1] | 1 | 1.3 | 5.3 | 7 | 40 | .47 |
| VII | $C_{11-15}$ borate [3] | 1 | 5 | 5 | 10-15 | 180 | .64 |

[1] Borate ester prepared according to Example X.
[2] Borate ester prepared by heating a mixture of secondary dodecyl esters with boric oxide.
[3] Borate ester prepared according to Example X using a $C_{11-15}$ n-paraffin cut obtained from Minas crude petroleum. The n-paraffins were isolated using urea adduction.

EXAMPLE VIII

A mixture of crude dodecyl borate [2] (1 part) was stirred at room temperature with 4 parts benzene and 4 parts concentrated sulfuric acid. The temperature rose to 40° C., the stirring being continued for 30 minutes. The reaction mixture was then poured into 200 parts water and sodium bicarbonate added slowly to neutralize the acid. The mixture was extracted continuously with benzene. The benzene solution was then dried and distilled yielding .71 part of phenyl dodecanes.

For comparison, the following example illustrates the use of phosphoric acid.

EXAMPLE IX

Into a flask was mixed 50 g. of toluene and 40 g. of 115% $H_3PO_4$. The temperature was raised to 100° C. (at lower temperature no reaction could be observed) and a solution of 20 g. t-butylborate in 50 g. of toluene was added. The temperature was maintained while the mixture was stirred for an additional hour. The mixture was then cooled, the toluene layer separated and distilled to remove the toluene. The remaining higher boiling material showed only 0.2 g. of t-butyltoluene as analyzed by mass spectrometer.

EXAMPLE X

The following is an illustration of an oxidation of a paraffin in the presence of boric acid to yield alkyl borates. Into a turbo mixer was introduced 300 parts of n-dodecane and 13 parts of boric oxide. Vigorous agitation was maintained. The temperature was raised to 170° C. and air introduced at a rate of 0.8 liter per minute. In 1.6 hours, a conversion of 20% had occurred. Of this, approximately 65% was in the form of crude borate esters.

When the same reaction was carried out using a gas concentration containing only 4% oxygen at a rate of 2 liters per minute for a period of 4 hours, a 21.4% conversion occurred with 75% of this being crude borate esters. The remaining converted paraffin is polyols and ketones.

This invention is extremely advantageous when preparing biodegradable detergents from paraffins. The borate esters may be prepared by the oxidation of paraffins in the presence of boric oxide. The use of aluminum chloride as a catalyst is prohibited because of the large number of oxygen atoms present in the crude borate ester which are not bonded to alkyl groups. It is well known in the Friedel-Crafts reaction that the amount of aluminum chloride used must frequently exceed the number of oxygens present. When, as in the case of the crude borate esters, in which not every oxygen is bonded to an alkyl group, great excesses of aluminum chloride would be necessary, making the process using aluminum chloride economically unfeasible.

As will be evident to those skilled in the art, various modifications on this process can be made or followed, in the light of the foregoing disclosure and discussion, without departing from the spirit or scope of the disclosure or from the scope of the following claims.

We claim:

1. A method of alkylating aromatic hydrocarbons which comprises treating at a temperature in the range of 0°–100° C. with an acid selected from the group consisting of sulfuric acid and hydrofluoric acid, wherein the water content of said acids is not greater than 10%, an aliphatic borate and an aromatic hydrocarbon.

2. A process according to claim 1 wherein said acid is substantially anhydrous hydrofluoric acid.

3. A process according to claim 1 wherein the equivalents of acid to equivalents of alkoxy groups in said aliphatic borate is at least 5:1 and the mol ratio of aromatic hydrocarbon to said alkoxy groups is at least 1:1.

4. A method of preparing alkyl benzenes which comprises treating at a temperature in the range of 0°–65° C. with an acid selected from the groups consisting of hydrofluoric acid and sulfuric acid wherein the water content of said acids does not exceed 10%, benzene and aliphatic borates wherein said aliphatic groups are from 8 to 20 carbons, the equivalents of acid to equivalents of alkoxy groups in said alpihatic borate being in the ratio of at least 10:1 and the mol ratio of benzene to said alkoxy groups being at least 4:1.

References Cited by the Examiner
UNITED STATES PATENTS

| | | | |
|---|---|---|---|
| 1,670,505 | 5/1928 | Gunther | 260—671 |
| 2,316,108 | 4/1943 | Ruthruff | 260—671 |
| 2,324,784 | 7/1943 | Lieber | 260—671 |
| 2,405,874 | 8/1946 | Bullard et al | 260—671 |

PAUL M. COUGHLAN, Primary Examiner.

ALPHONSO D. SULLIVAN, Examiner.

[2] The crude dodecyl borate was prepared according to Example X.